(12) United States Patent
Thomas et al.

(10) Patent No.: US 12,253,946 B2
(45) Date of Patent: Mar. 18, 2025

(54) METHOD AND SYSTEM FOR CACHE MANAGEMENT IN A NETWORK DEVICE

(71) Applicant: Telefonaktiebolaget LM Ericsson (publ), Stockholm (SE)

(72) Inventors: Anju Thomas, Bangalore (IN); Nitin Katiyar, Bangalore (IN); Vishal Deep Ajmera, Bangalore (IN); Venkatesan Pradeep, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/642,002

(22) PCT Filed: Aug. 10, 2020

(86) PCT No.: PCT/EP2020/072427
§ 371 (c)(1),
(2) Date: Mar. 10, 2022

(87) PCT Pub. No.: WO2021/052681
PCT Pub. Date: Mar. 25, 2021

(65) Prior Publication Data
US 2024/0045801 A1 Feb. 8, 2024

Related U.S. Application Data

(60) Provisional application No. 62/903,329, filed on Sep. 20, 2019.

(51) Int. Cl.
*G06F 12/0811* (2016.01)
*G06F 12/0891* (2016.01)

(52) U.S. Cl.
CPC ...... *G06F 12/0811* (2013.01); *G06F 12/0891* (2013.01); *G06F 2212/1021* (2013.01)

(58) Field of Classification Search
CPC ............ G06F 12/0811; G06F 12/0891; G06F 2212/1021
See application file for complete search history.

(56) References Cited

U.S. PATENT DOCUMENTS 5,729,713 A    3/1998   Leyrer
8,924,645 B2 * 12/2014   Chang ................... G06F 1/3268
                                                           711/E12.017

(Continued)

OTHER PUBLICATIONS

International Search Report and Written Opinion, PCT App. No. PCT/EP2020/072427, Oct. 20, 2020, 13 pages.

*Primary Examiner* — Baboucarr Faal
(74) *Attorney, Agent, or Firm* — Sage Patent Group

(57) ABSTRACT

Embodiments include methods to manage caches in a network device. In one embodiment, a method is performed by a network device and the method comprises determining a first cache of the network device is overloaded, where the first cache is within a cache hierarchy including a plurality of caches, each cache including a set of forwarding table entries for the network device to forward packets of traffic flows, and where one cache lower in the cache hierarchy is to be checked earlier in flow lookup than one higher in the cache hierarchy. The method further comprises upon determining that the first cache is overloaded, disabling the first cache from the flow lookup, where the flow lookup skips the first cache and is performed at a second cache higher in the cache hierarchy and disabling the first cache from forwarding table entry insertion when the forwarding table entry insertion is performed in one or more caches of the plurality of caches.

17 Claims, 7 Drawing Sheets

(56) References Cited

U.S. PATENT DOCUMENTS

| | | | |
|---|---|---|---|
| 9,244,843 B1 | 1/2016 | Michels et al. | |
| 2015/0281098 A1* | 10/2015 | Pettit | H04L 45/745 |
| | | | 370/235 |
| 2015/0281125 A1* | 10/2015 | Koponen | H04L 47/2441 |
| | | | 711/122 |
| 2019/0007515 A1* | 1/2019 | Baldwin | G06F 12/0888 |
| 2019/0042388 A1* | 2/2019 | Wang | G06F 12/084 |

* cited by examiner

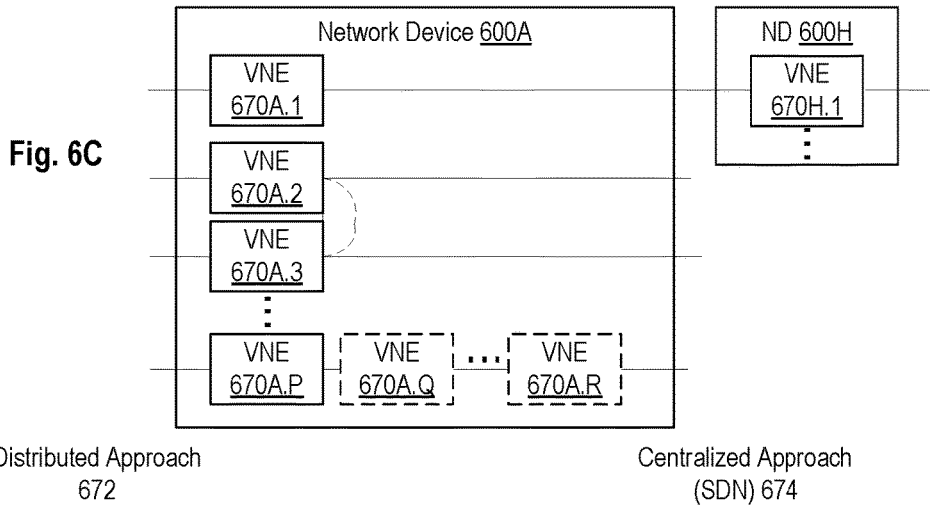
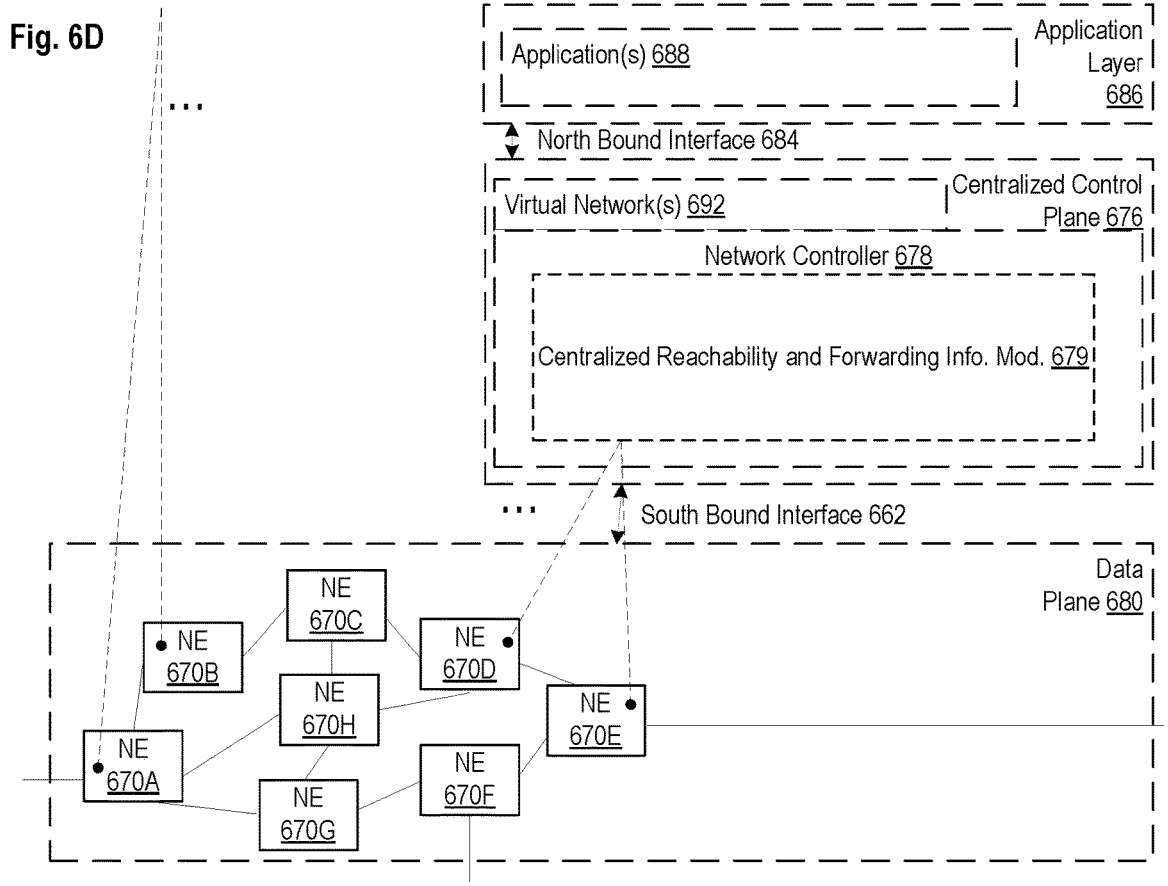
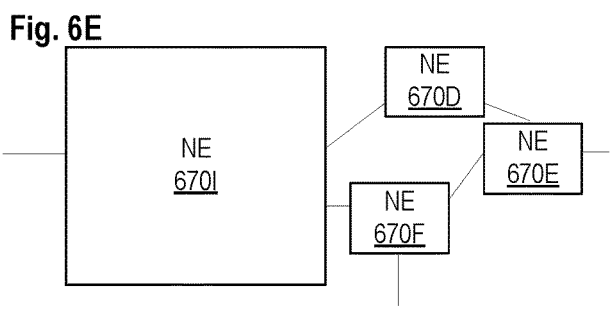
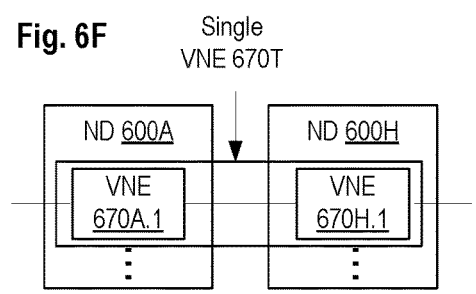

METHOD AND SYSTEM FOR CACHE MANAGEMENT IN A NETWORK DEVICE

CROSS-REFERENCE TO RELATED APPLICATIONS

This application is a National stage of International Application No. PCT/EP2020/072427, filed Aug. 10, 2020, which claims priority to U.S. Application No. 62/903,329, filed Sep. 20, 2019, which are hereby incorporated by reference.

TECHNICAL FIELD

Embodiments of the invention relate to the field of networking; and more specifically, to cache management in a network device.

BACKGROUND ART

A network device forwards packets of traffic flows to their respective destinations in a network. The network device may use a variety of databases to perform such forwarding. For example, a database for packet forwarding may contain a forwarding table including forwarding table entries, matching to which causes a packet to be forwarded based on the action indicated by the mapping entry. To support a large number of traffic flows, the database needs to include thousands or even millions of forwarding table entries. The database is typically hosted in a storage device and it is time consuming for the network device to traverse through the database to find the matching forwarding table entries.

To facilitate the database traversal, a network device may implement a cache hierarchy including multiple cache levels, and each cache level stores a number of flow table entries corresponding to the flow table entries within the database, often stored in a storage such as memory. The network device searches the caches for a matching flow table entry first when it determines how to forward a packet of a traffic flow. The network device searches the lowest level cache (the cache that is the closest to the processor/processor core) first; and if no match is found, it goes to the next higher-level cache. When no match is found in the cache hierarchy, it traverses through the database. When a matching entry is found in the higher-level cache (or the database), the match causes the cache(s) at the lower-level(s) to insert a corresponding matching entry so that when packets of the same traffic flow arrive, the network device may find a matching entry at the lower-level cache(s), without continuing the search up to the higher-level cache.

In a cache hierarchy, a lower-level cache often contains a smaller number of forwarding table entries. The cache insertion triggered by a matching entry found in a higher-level cache (or the database) may cause the lower-level cache to evict one or more existing forwarding table entries in the cache to make room for the newly inserted matching forwarding table entry. Yet the evicted forwarding table entries were inserted in the cache earlier to facilitate packets from other flows; when the packets from the other flows arrive after the eviction, the network device will need to insert the recently evicted forwarding table entries again, which may cause another recently inserted forwarding table entry to be evicted. The frequent insertion-eviction-insertion cycle causes degraded cache performance, and it reduces the packet forwarding capability of a network device.

SUMMARY

Embodiments include methods to manage caches in a network device. In one embodiment, a method is performed by a network device and the method comprises determining a first cache of the network device is overloaded, where the first cache is within a cache hierarchy including a plurality of caches, each cache including a set of forwarding table entries for the network device to forward packets of traffic flows, and where one cache lower in the cache hierarchy is to be checked earlier in flow lookup than one higher in the cache hierarchy. The method further comprises upon determining that the first cache is overloaded, disabling the first cache from the flow lookup, where the flow lookup skips the first cache and is performed at a second cache higher in the cache hierarchy and disabling the first cache from forwarding table entry insertion when the forwarding table entry insertion is performed in one or more caches of the plurality of caches.

Embodiments include network devices managing cache disabling/enabling. In one embodiment, a network device comprises a processor and non-transitory computer-readable storage medium that provides instructions that, when executed by the processor, cause the network device to perform the following: determining a first cache of the network device is overloaded, where the first cache is within a cache hierarchy including a plurality of caches, each cache including a set of forwarding table entries for the network device to forward packets of traffic flows, and where one cache lower in the cache hierarchy is to be checked earlier in flow lookup than one higher in the cache hierarchy; upon determining that the first cache is overloaded, disabling the first cache from the flow lookup, where the flow lookup skips the first cache and is performed at a second cache higher in the cache hierarchy, and disabling the first cache from forwarding table entry insertion when the forwarding table entry insertion is performed in one or more caches of the plurality of caches.

Embodiments include non-transitory computer-readable storage media for cache management. In one embodiment, a non-transitory computer-readable storage medium (618, 648) that provides instructions that, when executed by a processor of a network device, are capable of causing the network device to perform the following: determining a first cache of the network device is overloaded, where the first cache is within a cache hierarchy including a plurality of caches, each cache including a set of forwarding table entries for the network device to forward packets of traffic flows, and where one cache lower in the cache hierarchy is to be checked earlier in flow lookup than one higher in the cache hierarchy; upon determining that the first cache is overloaded, disabling the first cache from the flow lookup, where the flow lookup skips the first cache and is performed at a second cache higher in the cache hierarchy, and disabling the first cache from forwarding table entry insertion when the forwarding table entry insertion is performed in one or more caches of the plurality of caches.

These embodiments reduce cache thrashing, where a cache constantly hits the full scenario, multiple entries in the cache are constantly evicted and inserted at a high rate. The reduction enhances flow lookup performance and increase cache performance.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments.

FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of.

FIG. 6E illustrates the simple case of where each of the NDs implements a single NE, but a centralized control plane has abstracted multiple of the NEs in different NDs into (to represent) a single NE in one of the virtual network(s), according to some embodiments.

FIG. 6F illustrates a case where multiple VNEs are implemented on different NDs and are coupled to each other, and where a centralized control plane has abstracted these multiple VNEs such that they appear as a single VNE within one of the virtual networks, according to some embodiments.

DETAILED DESCRIPTION

Figure 1:
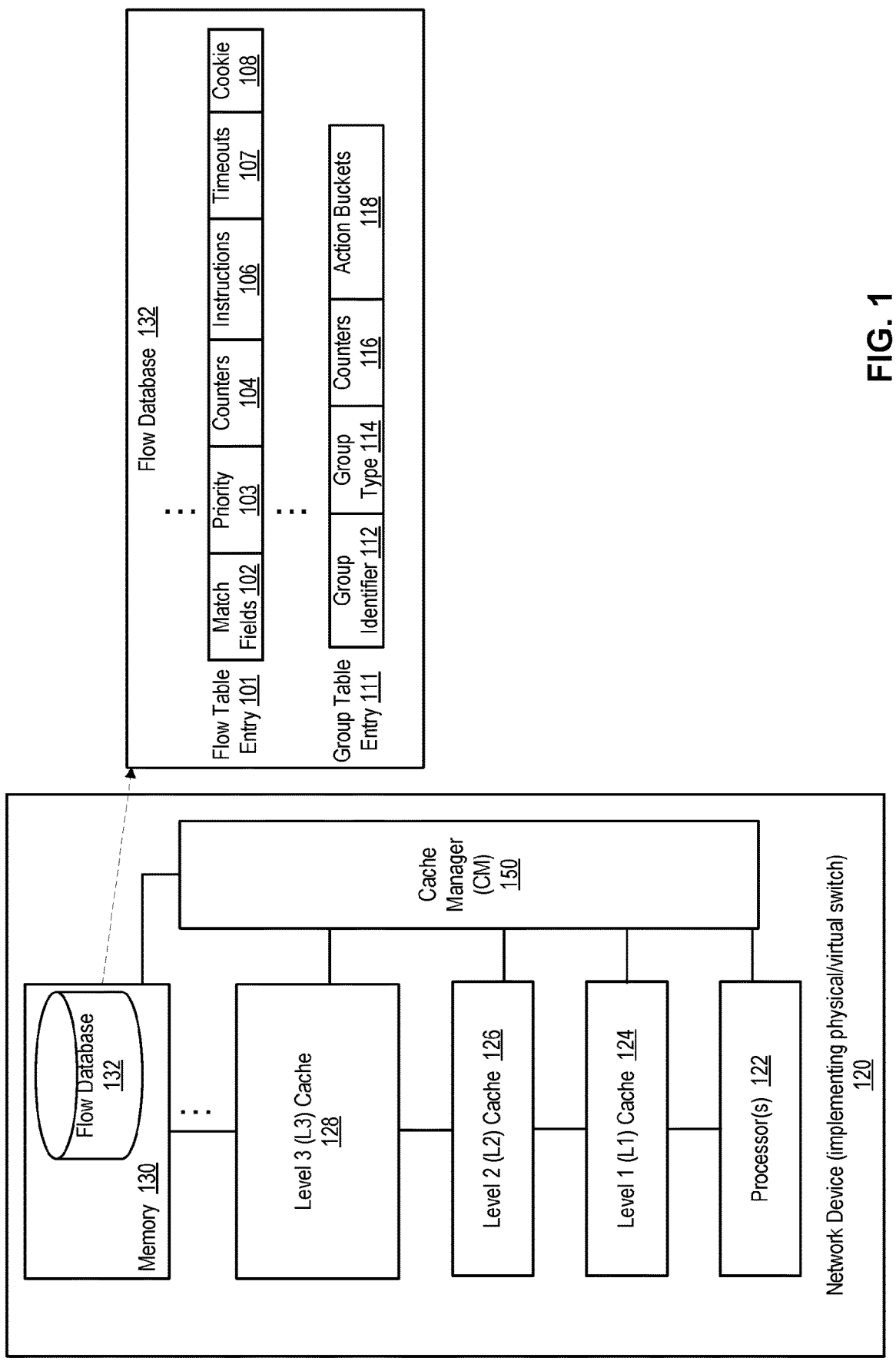
FIG. 1 illustrates the cache hierarchy of a network device per one embodiment.

The following description describes methods and apparatus for cache management in a network device. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Terms

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description, embodiments, and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

A network device (also referred to as a network node, or simply node) is an electronic device (defined herein below) that communicatively interconnects other electronic devices on a communications network. A switch may be implemented in a network device to forward packets of a traffic flow to another network device. A traffic flow (or simply flow) may be defined as a set of packets whose headers match a given pattern of bits. A flow may be identified by a set of attributes embedded to one or more packets of the flow. An exemplary set of attributes includes a 5-tuple (source and destination IP addresses, a protocol type, source and destination TCP/UDP ports).

The switch may be virtualized as a virtual switch (also referred to as software switch or a virtual network element). For example, Open vSwitch (often referred to as OVS) is an open-source implementation of a distributed virtual switch. The virtual switch can operate both as a software-based network switch running within a virtual machine (VM) hypervisor, and as the control stack for dedicated switching hardware. As such, the virtual switch has been implemented in multiple virtualization platforms, switching chipsets, and networking hardware accelerators.

The switch may operate in networks implementing one or more of a variety of management interfaces and protocols such as software-defined networking (SDN), NetFlow, sFlow (short for Sampled flow), SPAN (Switched Port ANalyzer), RSPAN (Remote Switched Port ANalyzer), CLI (Command-Line Interface), LACP (Link Aggregation Control Protocol) and 802.1ag.

Cache Hierarchy

FIG. 1 illustrates the cache hierarchy of a network device per one embodiment. A network device 120 may implement one or more virtual or physical switches (also referred to hardware switches). The details of the network device implementation are discussed relating to the network device 602, 604, or 606 in FIG. 6 herein below. The network device 120 includes one or more processors 122 to process and forward packets of various flows.

The processors 122 forward the packets using a flow database 132, which includes a number of forwarding tables such as flow tables and group tables. These forwarding tables may be generated based on instructions from the network device and/or a network controller (e.g., an SDN controller). Each table includes one or more table entries. FIG. 1 illustrates an exemplary flow table entry 101 and an exemplary group table entry 111 according to one embodiment.

Flow table entry 101 includes:

Match fields 102: To match against packets. These match fields match comprise the ingress port and packet headers, and optionally metadata specified by a previous table.

Priority 103: Matching precedence of a flow table entry.

Counters 104: Updated when packets are matched.

Instructions 106: To modify the action set or packet pipeline processing.

Timeouts 107: Maximum amount of time or idle time before flow is expired by the network device.

Cookie 108: Opaque data value chosen by a network controller. May be used by the network controller to filter flow statistics, flow modification, and flow deletion.

A flow table entry may be identified by its match fields and priority; the match fields and priority taken together identify a unique flow table entry in the flow table. A flow table entry generally allows the packets of a matching flow to be dropped or forwarded to one port. That is, a flow table entry generally allows a network device to dispose a packet to one port.

In contrast, a group table entry may allow a network device to dispose a packet to one port, one of multiple ports, or multiple ports. The group table entry 111 includes:

Group identifier 112: A numeric number (e.g., a 32-bit unsigned integer) uniquely identifying a group.

Group type 114: To determine group semantics.

Counters 116: Updated when packets are processed by a group.

Action buckets 118: An ordered list of action buckets, where each action bucket includes a set of actions to execute and associated parameters.

A group table entry may be identified by a group identifier. A group table entry generally allows the packets of a matching flow to be forwarded to the following: a random port on a group of ports (for load-balancing), a first live port on a group of ports (for failover), and all ports on a group of ports (for multicasting). Thus, a group table entry allows a network device to dispose a packet to multiple ports.

The flow database 132 may store thousands or even millions of flow and group table entries such as the flow table entry 101 and group table entry 111. As such, the flow database 132 may take a large storage space of the memory 130 of the network device 120. Indeed, while FIG. 1 shows that the flow database 132 within the memory 130 of the network device 120, a portion or the whole flow database 132 may be stored in a separate physical storage space (e.g., another electronic device). Note the flow and group table entries are referred to as forwarding table entries (or simply entries), and a forwarding table entry (or simply entry) to be inserted to a cache and/or evicted from the cache can be either a flow table entry or a group table entry.

The operation of the processors 122 searching for a matching forwarding table entry (e.g., a matching flow/group table entry) is referred to as flow lookup, and a flow lookup going through the thousands/millions of flow and group table entries is time-consuming. Thus, the network device may implement a cache hierarchy including a number of cache levels. FIG. 1 shows an example of three levels of cache, levels 1 to 3 at references 124 to 128, but more or less levels of caches may be implemented.

A lower-level cache (e.g., the cache closer to the processor(s) 122) typically has a smaller storage space and contains less forwarding table entries compared to a higher-level cache (e.g., the cache further away from the processor(s) 122). Additionally, the forwarding table entries in the lower-level cache are typically more specific in their match criteria. For example, the match fields may include less wildcard fields. A match field may be wildcarded (match any value) and in some cases bitmasked (match subset of bits) to make the match field be more generic. For the same flow, a matching forwarding table entry in a lower-level cache may be more specific than the corresponding forwarding table entry in a higher-level cache. Thus, two different flows may match to one forwarding table entry in the higher-level cache (e.g., L2 cache), yet they match to two forwarding table entries in the lower-level cache (e.g., L1 cache). Because the lower-level cache includes lesser forwarding table entries and/or more specific match criteria, the flow lookup is often more efficient (taking less time/bandwidth/hardware resources) at the lower-level cache than the higher-level cache.

When a packet of a flow is received at the network device 120, the network device 120 performs a flow lookup at the L1 cache 124 first. When a matching forwarding table entry is found (a cache hit), the entry is provided to the processor(s) 122 for further processing. If no matching forwarding table entry is found (a cache miss), the network device 120 proceeds to the next level cache, L2 cache 126 to perform the flow lookup to see if there is a cache hit, and if so, the entry is provided to the processor(s) 122. Otherwise (a cache miss), the network device 120 proceeds to the next level cache, L3 cache 128. If no matching forwarding table entry is found there, the network device 120 determines that the flow lookup has exhausted the cache hierarchy (since cache miss is returned in the full cache hierarchy) and it then performs the flow lookup at the flow database 132 in memory 130. If no matching forwarding table entry is found in the cache hierarchy and the memory 130 storing the flow database 132, the network device 120 will work with a network controller in some embodiments to determine how to forward the packet and generate a forwarding table entry to forward the packet.

When the matching forwarding table entry is found at the higher level cache (a cache hit) or the flow database (or the forwarding table entry being generated by the network device/network controller), the forwarding table entry is inserted in all the caches to ensure that the subsequent packets belonging to the same flow will be found in the cache and no flow lookup in the flow database is required again. The insertion to a cache may cause the eviction of one or more existing forwarding table entries when the cache is full. A cache is full when it occupies all the allocated space, and a request to insert another entry causes the eviction of one or more existing entries. The cache may be deemed full based on different criteria at different cache levels. For example, a lower level cache can be a hash table-based cache such that for a given hash, two entries are stored in the forwarding table of the cache. When an entry is required to be inserted into the cache and both the entries are filled, the cache is full for the entry. The network device will evict one of these entries to insert the new entry.

Since inserting a forwarding table entry in a cache can cause an eviction of existing forwarding table entry in case of cache full, it is possible that for some traffic patterns the cache may stay in a constant full state and hence result in repeated evictions. The likelihood of a cache full scenario being hit (resulting in a cache entry eviction) is much higher in the lower level caches when the number of unique flows is much larger than the cache size.

When a cache constantly hits the full scenario, multiple entries in the cache are constantly evicted and inserted at a high rate. This is often referred to as cache thrashing. When that happens to a cache, the cache may not give the intended boost in performance for the thrashed flows but cause a dip in flow lookup performance instead.

Embodiments aim at reducing cache thrashing by disabling a cache when a cache thrashing condition is detected, partially enabling the cache and monitoring the cache's performance, and enabling the cache when the performance is satisfactory. The disabling and enabling of various levels of cache may be coordinated by a cache manager 150, which causes the flow lookup and forwarding table entry insertion to skip a cache when the cache is disabled, causes the flow lookup to skip the cache but to allow forwarding table entry insertion at the cache when the cache is in the partially enabled state, and causes the cache to be enabled once the cache performance satisfies a criteria as discussed herein.

Disable/Enable a Cache

Figure 2:
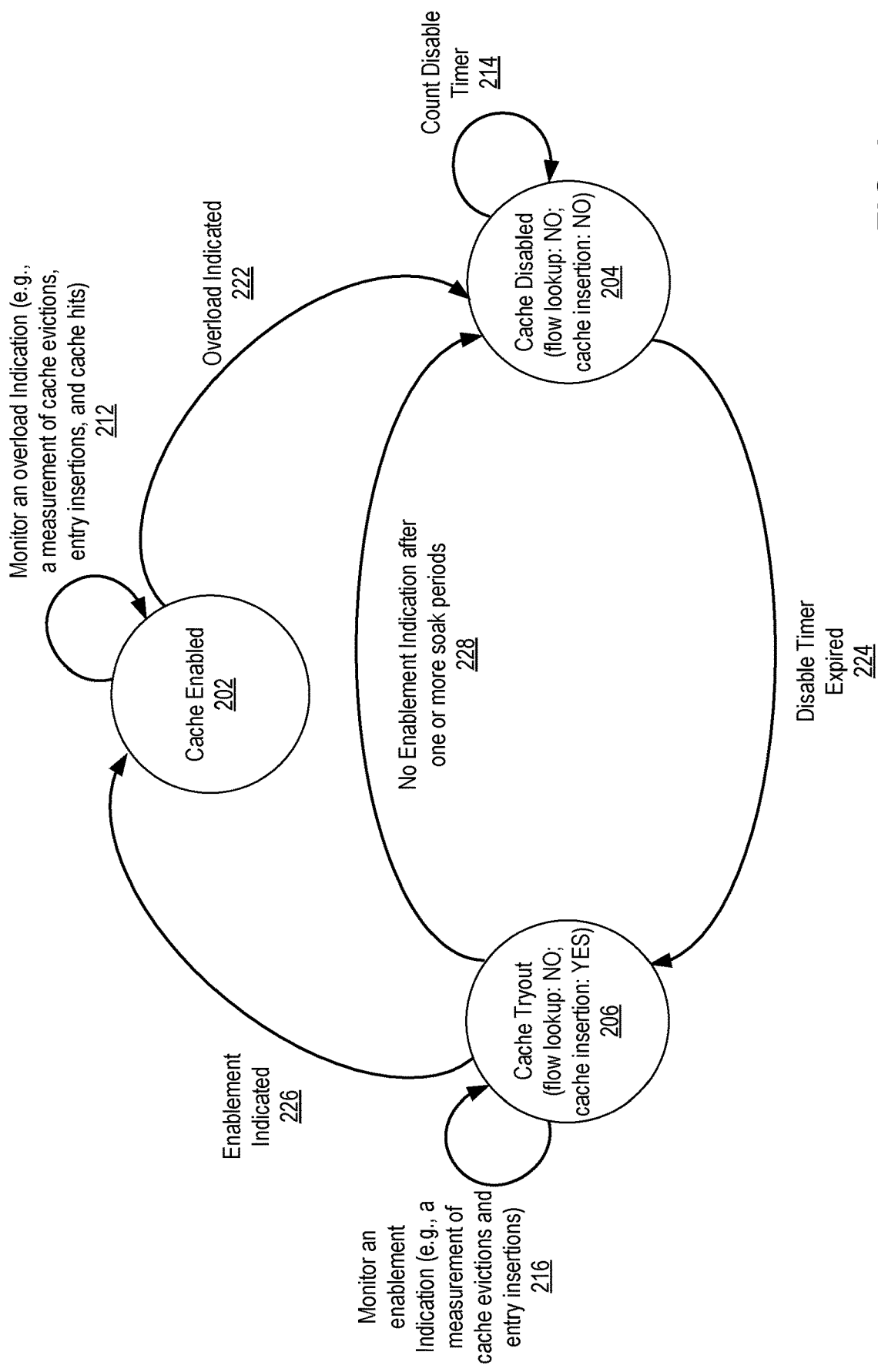
FIG. 2 illustrates a state machine of a cache per one embodiment.

FIG. 2 illustrates a state machine of a cache per one embodiment. The cache can be any one of the caches L1 to L3 in FIG. 1 (or any other levels of caches in a different embodiment). The transition between different states of the cache may be coordinated by a cache manager such as the cache manager 150.

The cache starts at the cache enabled state at reference 202. At the cache enabled state, a network device may perform flow lookup at the cache and forwarding table entries may be inserted at the cache due to matching at another level of cache or the flow database (or due to a new matching forwarding table entry is generated by a network device/network controller).

The cache in the cache enabled state monitors an overload indication at reference 212. The cache may select a sample time period T and monitor an overload indication for the cache. In one embodiment, the overload indication may be calculated using a measurement including counts of cache evictions, entry insertions, and cache hits during the sample time period T. For example, the overload indication during a sample time period may be calculated as the following:

$$\text{Overload Indication} = \frac{\text{Number of Cache Evictions}}{(\text{Number of Entry Insertions} + \text{Number of Cache Hits})} \quad (1)$$

The overload indication may be compared to a threshold, which is user configurable and can be different for different levels of cache and during different run periods and/or network conditions. In one embodiment, when the overload indication is over the threshold in the sample time period T, the cache is deemed to be overloaded. Alternatively, the cache is deemed to be overloaded only after the overload indication is over the threshold (or another threshold specifically for multiple sample time periods) in several time periods (consecutively or in the majority of a defined consecutive sample time periods). Once the cache is deemed to be overloaded, the overload condition is indicated at reference 222, and the state of the cache is transitioned to a cache disabled state 204. When the cache is deemed to operate normally without being overloaded, the counts of cache evictions, entry insertions, and cache hits may be reset (i.e., reset to zero or other defined values) and the cache manager continue monitoring the overload indication in the next sample time periods at reference 212.

At the cache disabled state 204, the network device no longer performs flow lookup at the cache and forwarding table entries are not inserted into the cache due to the forwarding table entries matching at another level of cache or flow database. The network device will skip the cache and perform the flow lookup and entry insertion at other caches and flow database. Once the cache enters the cache disabled state 204, a disable timer is triggered at reference 214 to determine when to try to enable the cache, and the timer may be set to $T_{dry}$, which is a time period for the cache to wait until a soak time period starts. The timer is also configurable and can be different for different levels of cache and during different run periods and/or network conditions.

Once the disable timer expires at reference 224, the state machine moves to the cache tryout state 206. During the cache tryout state 206, the cache is partially enabled so that while no flow lookup is performed at the cache, forwarding table entries may be inserted into the cache due to matching at another level of cache or flow database. Thus, when the cache is in the cache tryout state 206, the network device will skip the cache and perform the flow lookup at other caches and flow database, yet the network device will insert the forwarding table entries into the cache due to the forwarding table entries matching at another level of cache or flow database.

At the cache tryout state 206, the cache manager monitors a cache enablement indication to determine at reference 216 whether to fully enable the cache. The cache enablement indication may be based on a measurement of cache eviction counts and entry insertion counts in one or more soak time periods ($T_{soak}$). The cache enablement indication during a soak time period may be calculated as the following:

$$\text{Cache Enablement Indication} = \frac{\text{Number of Cache Evictions}}{\text{Number of Entry Insertions}} \quad (2)$$

The cache enablement indication may be compared to another threshold, which also is user configurable and can be different for different levels of cache and during different run periods and/or network conditions. In one embodiment, when the cache enablement indication is below the threshold in the soak time period, the cache enablement indication is deemed to be set (i.e., cache enablement being indicated). Alternatively, the cache enablement indication is deemed to be set only after the cache enablement indication is below the threshold (or another threshold specifically for multiple soak time periods) in several time periods (consecutively or in the majority of a defined consecutive time periods). Once the cache enablement is indicated at reference 226, the state machine returns to the cache enabled state 202.

If the cache enablement indication is over the threshold in one or more soak time periods, it is deemed at reference 228 that no enablement indication is set, and the state machine returns to the cache disabled state 204. In some embodiments, the cache manager adds a back-off time ($T_{backoff}$) so that the cache stays in the cache disabled state 204 longer before it returns to the cache tryout state 206 (New Disable Timer=$T_{dry}+T_{backoff}$). The back-off time can be chosen randomly within a range or determined following a formula.

Note that while Formulas (1) and (2) give examples of calculating the overload indication and the cache enablement indication, they are for illustration only. Embodiments include other ways to determine the overload indication and the cache enablement indication using other measurements. For example, other measurements may use other arithmetic relationships such as addition, subtraction, multiplication, and division to calculate (1) the overload indication using two or more of the numbers of cache evictions, entry insertions, and cache hits, and/or (2) the enablement indication using the numbers of cache evictions, entry insertions, and other measurements. When another measurement is used, the threshold crossing criteria may be updated as well. For example, when the cache enable indication is defined in reverse of Formula (2), so that the number of cache evictions is a denominator and the number of entry insertions is a numerator, the cache enablement indication will be deemed to be set when the cache enablement indication is over the threshold.

Some Embodiments

Figure 3:
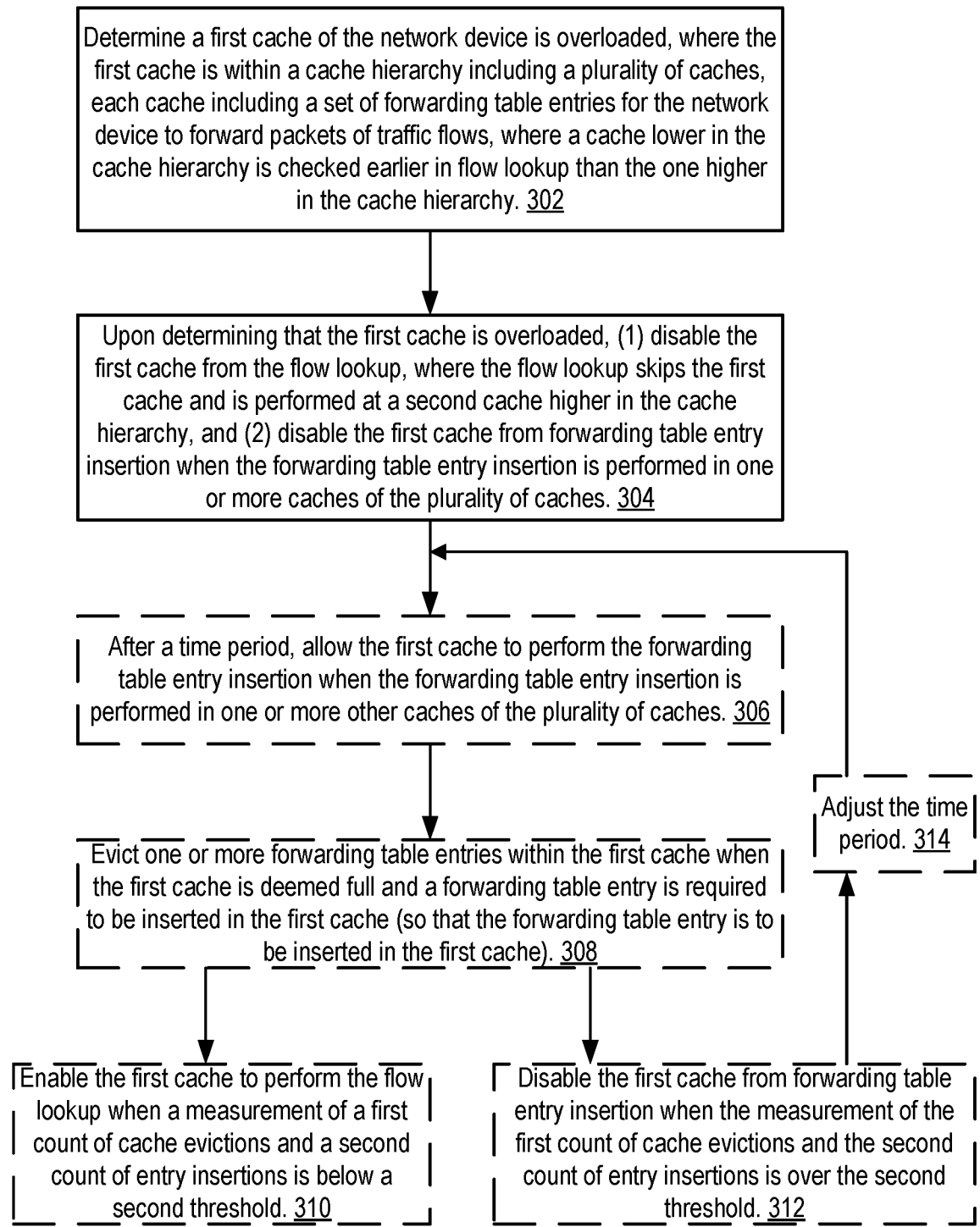
FIG. 3 is a flow diagram showing the operations of cache management of a network device per one embodiment.

FIG. 3 is a flow diagram showing the operations of cache management of a network device per one embodiment. The network device may be network device 120 discussed herein above. The operations may be performed by a cache manager such as the cache manager 150.

At reference 302, it is determined that a first cache of the network device is overloaded. The first cache is within a cache hierarchy including a plurality of caches, and each cache includes a set of forwarding table entries for the network device to forward packets of traffic flows. A cache lower in the cache hierarchy (closer to the one or more processors of the network device) is to be checked earlier in flow lookup than the one higher in the cache hierarchy. The first cache is determined to be overloaded based on a first measurement as detailed relating to reference 402 of FIG. 4 herein below.

At reference 304, upon determining that the first cache is overloaded, the first cache is disabled from the flow lookup, where the flow lookup skips the first cache and is performed at a second cache higher in the cache hierarchy; and the first cache is also disabled from forwarding table entry insertion when the forwarding table entry insertion is performed in one or more caches of the plurality of caches.

Optionally after a time period (e.g., $T_{dry}$, the time period for the cache to wait until a soak time period starts), the first cache is allowed to perform the forwarding table entry insertion at reference 306 when the forwarding table entry insertion is performed in one or more other caches of the plurality of caches. Yet the first cache is still disabled from the flow lookup. That is, the cache is in cache tryout state 206.

After the forwarding table entry insertion is allowed, one or more forwarding table entries within the first cache may be evicted at reference 308 when the first cache is deemed full and a forwarding table entry is required to be inserted in the first cache so that the forwarding table entry is to be inserted in the first cache.

When a second measurement of a first count of cache evictions and a second count of forwarding table entry insertions is below a second threshold in a second time period, the first cache is enabled to perform the flow lookup at reference 310. The second measurement of the first count of cache evictions and the second count of forwarding table entry insertions is the cache enablement indication in one embodiment. The second time period is one soak time period ($T_{soak}$) in some embodiments, and multiple soak time periods in alternative embodiments as discussed herein. At reference 310, the cache can perform both flow lookup and forwarding table entry insertion, thus the cache is fully enabled.

On the other hand, when the second measurement of the first count of cache evictions and the second count of forwarding table entry insertions is over the second threshold in a configured time period, the first cache is disabled from the forwarding table entry insertion at reference 312. The configured time period may be one soak time period ($T_{soak}$) in some embodiments, and multiple soak time periods in alternative embodiments as discussed herein. Once the forwarding table entry insertion is disabled, the flow goes to reference 314, where a time period ($T_{dry}$) may be adjusted before the first cache is allowed to enable the forwarding table entry insertion again at reference 306. The time period is adjusted to include the back-off time as discussed herein above in one embodiment.

Figure 4:
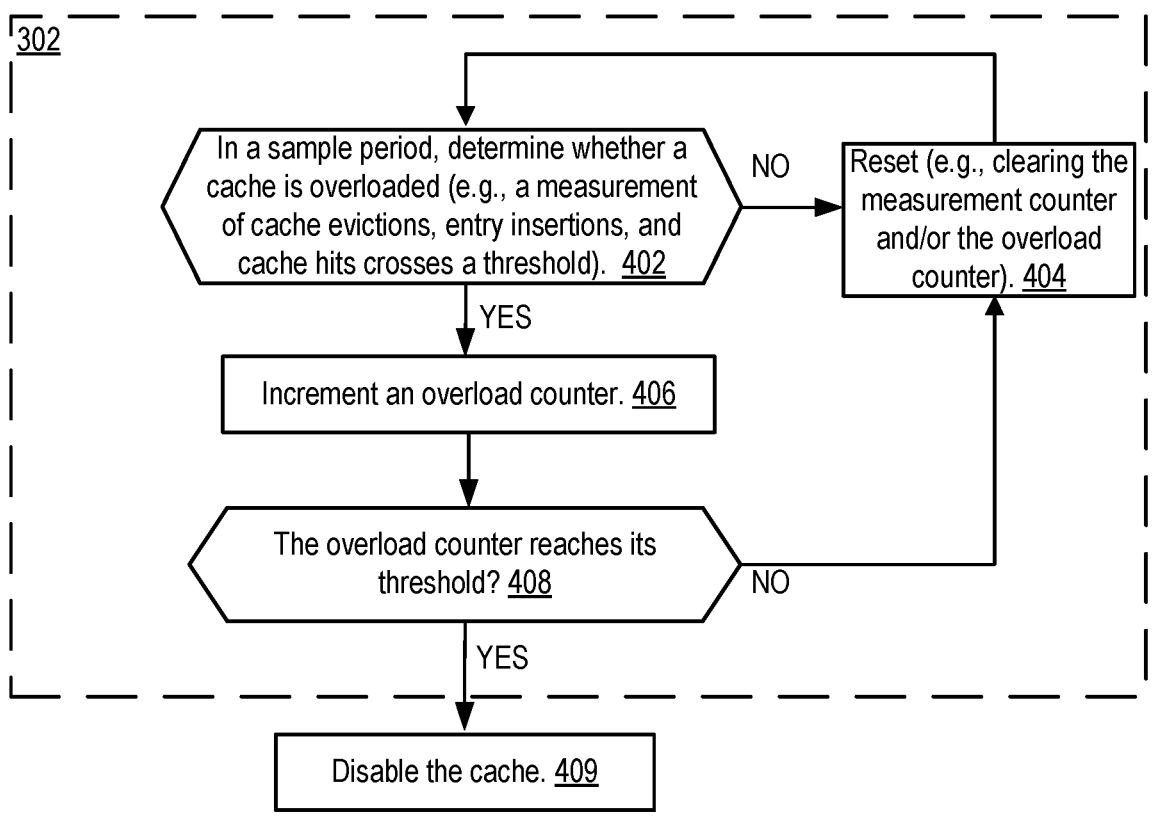
FIG. 4 is a flow diagram showing the operations of disabling a cache of a network device per one embodiment.

FIG. 4 is a flow diagram showing the operations of disabling a cache of a network device per one embodiment. The operations in FIG. 4 is an embodiment of reference 302. At reference 402, a cache is determined whether it is overloaded in a sample time period. The overload condition may be determined based on evaluating one or more of a first count of cache evictions, a second count of forwarding table entry insertions, and a third count of cache hits in one embodiment. In one embodiment, the measurement is calculated using Formula (1), and the cache is determined to be overloaded when a first measurement of the first, second, and third count crosses a first threshold as discussed herein above.

When the cache is not overloaded, the flow goes to reference 404, where the measurements are reset. The measurement reset may include resetting the measurement counters for the measurement relating to Formula (1). When the cache is deemed to be overloaded only upon the cache being overloaded over multiple consecutive sample time periods, the overload counter will be reset (e.g., reset to zero) as well. When the cache is deemed to be overloaded upon the cache being overloaded over a majority of consecutive sample time periods, the overload counter will not be reset but the cache manager may remove the count due to earlier sample time periods (e.g., a sliding window count of how many recent sample time periods are deemed overloaded). After the reset, the cache goes through another sample time period to determine whether the cache is overloaded. Note that some back-off time may be added before performing the next sampling so that the cache overload monitoring may not take too much resources of the network device.

When the cache is determined to be overloaded in the sample period, the flow goes to reference 406, where an overload counter increases (e.g., by one). Then the flow goes to reference 408, where it is determined whether the overload counter reaches its threshold. If it does not reach, the flow may go to reset 404, where the measurement counters for the measurement relating to Formula (1) are reset but the overload counter is not, so that the earlier overload periods remaining in the calculation, until the overload counter finally reaches its threshold at reference 408. Once the threshold is reached, the flow goes to reference 409, where the cache is deemed to be overloaded and is then disabled. As such, the first cache is determined to be overloaded thus to be disabled in some embodiments when the first measurement of the first, second, and third count crosses the first threshold in a plurality of consecutive intervals or a majority of the consecutive intervals.

Figure 5A:
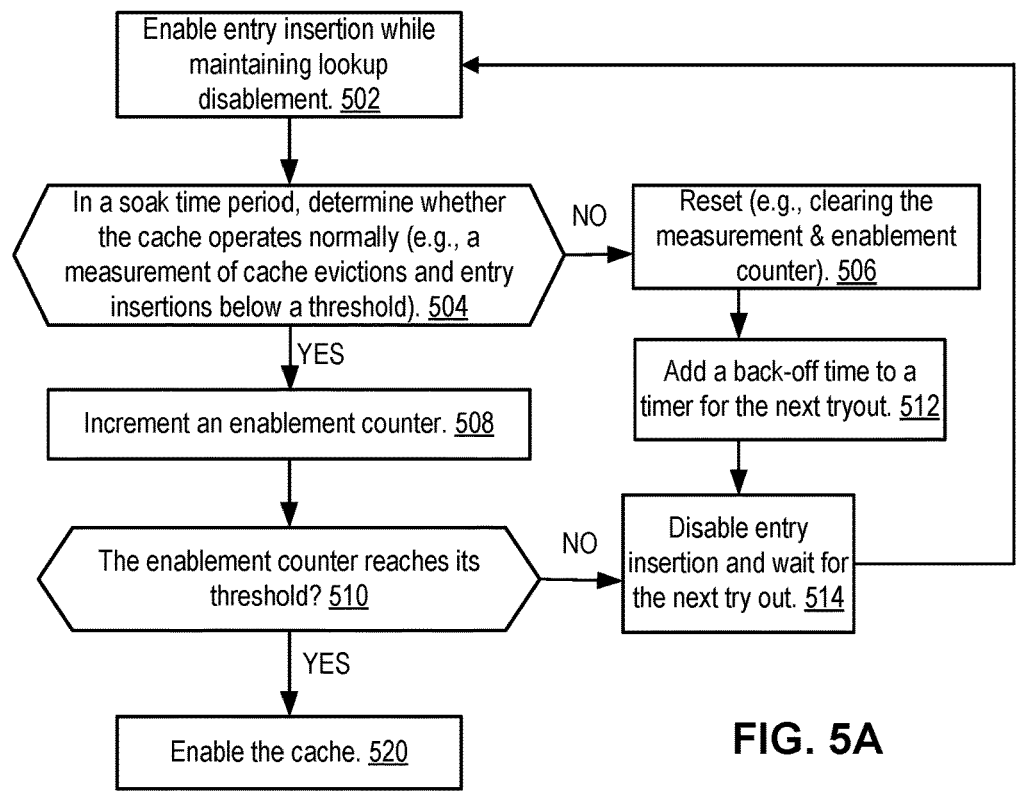
FIG. 5A is a flow diagram showing the operations of enabling a cache of a network device according to one embodiment.

FIG. 5A is a flow diagram showing the operations of enabling a cache of a network device according to one embodiment. The operations start when the cache is already in a disabled state as in the cache disabled state 204. The cache manager may cause the cache to stay in the disabled state for a period of time such as the duration of $T_{dry}$ discussed herein above.

At reference 502, the forwarding table entry insertion is enabled while the flow lookup remains disabled. Then at reference 504, in a soak time period, it's determined whether the cache operates normally and is ready to be enabled. The determination may be based on evaluating one or more of a first count of cache evictions and a second count of forwarding table entry insertions. In one embodiment, the measurement is calculated using Formula (2), and the cache is determined to be in a normal operation state when a second measurement (cache enablement indication) of the first and second counts below a second threshold as discussed herein above.

When the cache does not operate normally, the flow goes to reference 506, where the measurements are reset. The measurement reset may include resetting the measurement counters for the measurement relating to Formula (2). When the cache is deemed to operate normally only when the cache operates normally over multiple consecutive sample time periods, the enablement counter will be reset (e.g., reset to zero) as well. When the cache is deemed to operate normally when the cache operates normally over a majority of consecutive sample time periods, the enablement counter will not be reset, similar to the overload counter discussed herein above.

At reference 512, a back-off time is added to a timer for the next tryout (e.g., the new disable Timer=$T_{dry}$+$T_{backoff}$ as discussed herein). Then at reference 514, the forwarding table entry insertion is disabled again, and after waiting for the timer to reach the next tryout expires, the flow goes back to reference 502 again.

When the cache operates normally, the flow goes to reference 508, where an enablement counter increases (e.g., by one). Then the flow goes to reference 510, where it is determined whether the enablement counter reaches its threshold. If it does not reach, the flow goes to reference 514 and then after waiting for the timer to reach the next tryout expires, the flow goes back to reference 502 again.

When it is determined that the enablement counter reaches its threshold, the flow goes to reference 520, where the cache is enabled, and it may perform flow lookup and forwarding table entry insertion as a functioning cache.

Figure 5B:
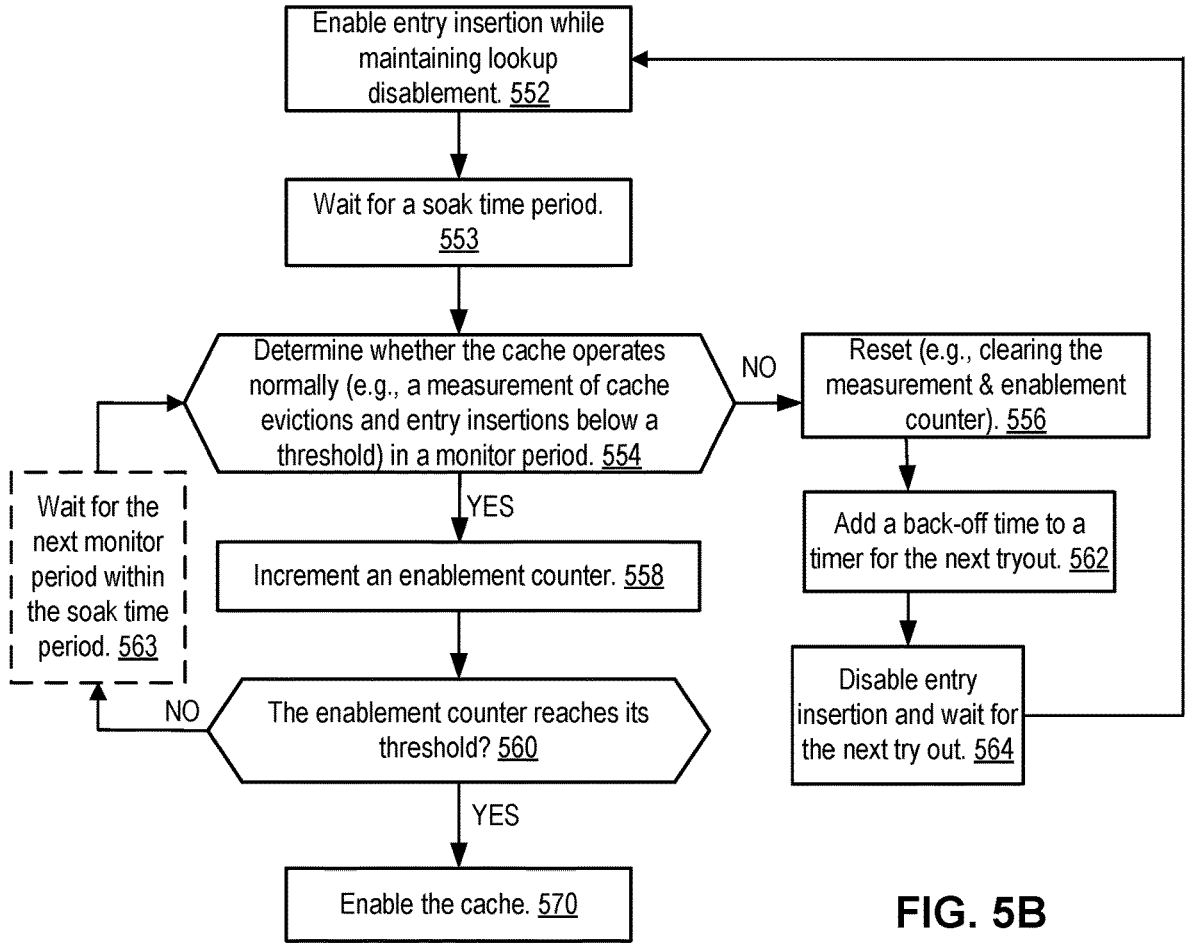
FIG. 5B is a flow diagram showing the operations of enabling a cache of a network device according to another embodiment.

FIG. 5B is a flow diagram showing the operations of enabling a cache of a network device according to another embodiment. FIG. 5B is similar to FIG. 5A and similarly numbered reference boxes operate similarly. One difference is that while the operations in FIG. 5A make the cache enablement determination over multiple soak time periods, operations in FIG. 5B make the cache enablement determination over multiple monitor periods within a single soak time period.

In FIG. 5B, after the cache is partially enabled at reference 552, the flow goes to reference 553, which waits for the start of a soak time period. The soak time period includes a plurality of monitor periods, which may be consecutive time intervals with or without time gaps in between. The time gaps may be distributed evenly or unevenly based on one or more distribution function when the time gaps are included.

At reference 554, the determination of whether the cache operates normally is now made within a monitor period. If the cache fails to operate normally, the flow goes to references 556, 562, and 564, which include operations similar to the operations in references 506, 512, and 514 of FIG. 5A, respectively. If the cache operates normally, the flow goes to reference 558 and then 560, which include operations similar to the operations in reference 508 and 510, respectively. When the enablement counter is determined that it has not reached its threshold yet, the flow goes to reference 563 to wait for the next monitor period within the soak time period when time gaps are set in between the monitor periods. Otherwise the flow goes directly to reference 554, where the determination of whether the cache operates normally is performed again.

Embodiments determine when a system is consistently overloading a cache and use that information to dynamically disable the cache thereby reducing or eliminating cache thrashing and improving packet switching performance. For example, the embodiments of the invention may result in a faster flow lookup and less resources consumed for the flow lookup since more cache hits and less cache evictions may be resulted by reducing the cache thrashing. Embodiments of the invention create a self-learning system that automatically disables a cache if the cache will not provide performance benefit but rather causes degradation. Once the cache can operate normally, the cache is then enabled to improve flow lookup efficiency. Thus, the embodiments provide the optimal utilization of a cache hierarchy by reacting to change in traffic pattern over time.

Network Environments Under Which Embodiments of the Invention May Operate

Figure 6A:
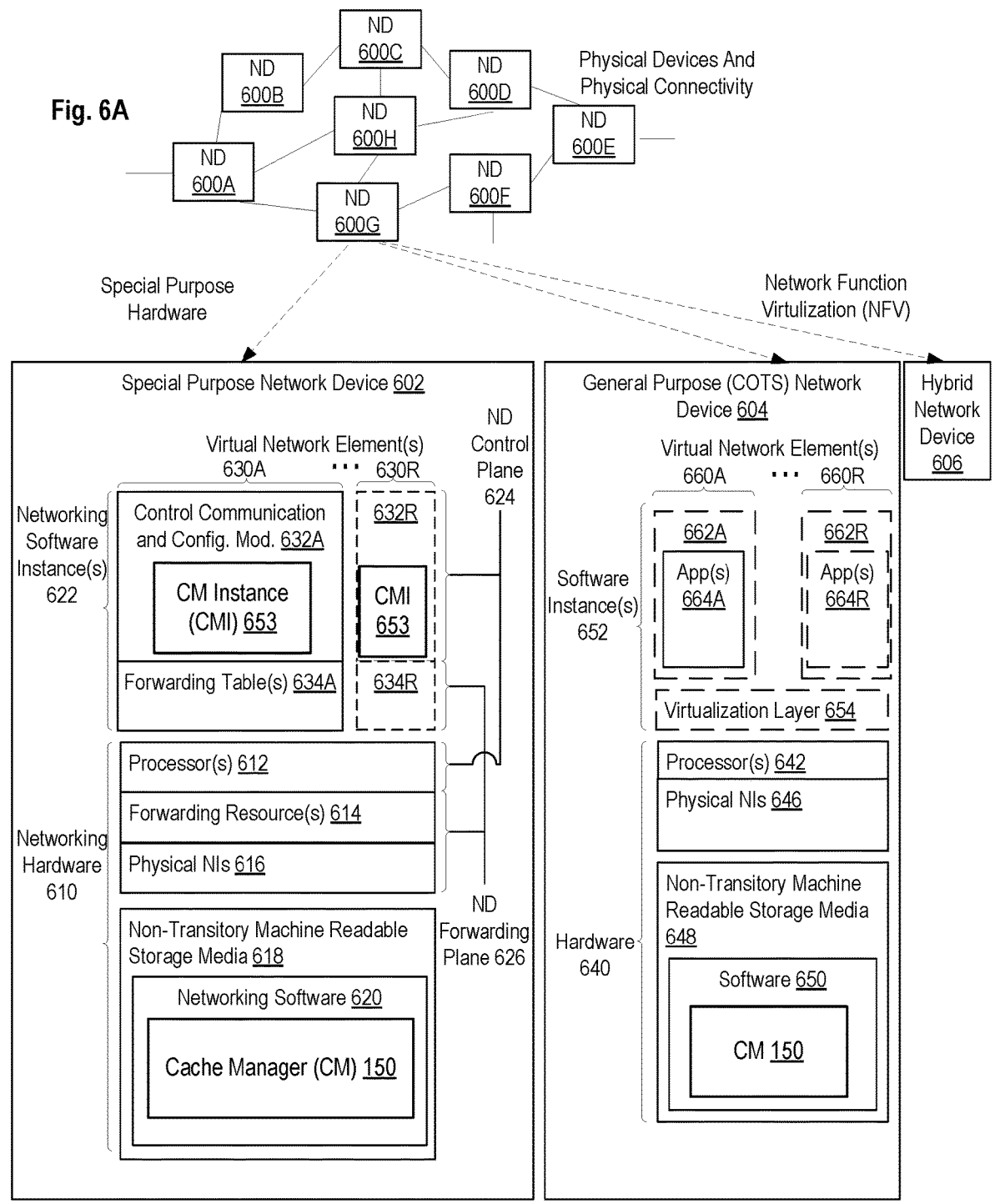
FIG. 6A illustrates connectivity between network devices (NDs) within an exemplary network, as well as three exemplary implementations of the NDs, according to some embodiments.

FIG. 6A illustrates connectivity between network devices (NDs) within an exemplary network, as well as three exemplary implementations of the NDs, according to some embodiments. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In one embodiment, the networking software 620 contains the cache manager 150. The cache manager 150 may perform operations described with reference to earlier figures. The cache manager 150 may generate one or more cache manager instance (CMI) 653, each for a virtual network element (e.g., a virtual switch) and the CMI 653 manages the cache disabling/enabling of the cache of a virtual network element.

The special-purpose network device 602 is often physically and/or logically considered to include: 1) a ND control plane 624 (sometimes referred to as a control plane) comprising the processor(s) 612 that execute(s) the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out to the appropriate ones of the physical NIs 616 based on the forwarding table(s) 634A-R.

Figure 6B:
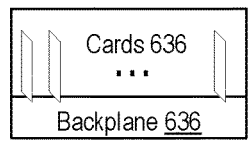
FIG. 6B illustrates an exemplary way to implement a special-purpose network device according to some embodiments.

FIG. 6B illustrates an exemplary way to implement the special-purpose network device 602 according to some embodiments. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general-purpose network device 604 includes hardware 640 comprising a set of one or more processor(s) 642 (which are often COTS processors) and physical NIs 646, as well as non-transitory machine-readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment, the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers). Note that the networking software 650 includes the cache manager 150, whose operations are discussed herein. The cache manager 150 may be instantiated in the virtualization layer 654 and/or applications 664 in some embodiments.

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high-volume server hardware, physical switches, and physical storage, which could be located in data centers, NDs, and customer premise equipment (CPE). While embodiments are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 630A-R, VNEs 660A-R, and those in the hybrid network device 606) receives data on the physical NIs (e.g., 616, 646) and forwards that data out to the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values).

FIG. 6C illustrates various exemplary ways in which VNEs may be coupled according to some embodiments. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general-purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometimes referred to as the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. In one embodiment, centralized reachability and forwarding information module 679 includes an encryption coordinator 675, which may coordinate the acquisition of the keying materials (e.g., keys and cipher algorithms) necessary to secure the communication between an intermediate network device and an endpoint (client or server) network device as discussed herein above.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674 but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 674 but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively, or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments. Thus, the abstraction of a NE or VNE can span multiple NDs.

While some embodiments implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 676, and thus the network controller 678 including the centralized reachability and forwarding information module 679, may be implemented in a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus)). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations, other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection-oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection-oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e., the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection-oriented packet switching, meaning that data is always delivered along the same network path, i.e., through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes; for example, aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS)) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Note that an electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other forms of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment may be implemented using different combinations of software, firmware, and/or hardware.

A network node/device is an electronic device. Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Examples of network nodes also include NodeB, base station (BS), multi-standard radio (MSR) radio node (e.g., MSR BS, eNodeB, gNodeB. MeNB, SeNB), integrated access backhaul (IAB) node, network controller, radio network controller (RNC), base station controller (BSC), relay, donor node controlling relay, base transceiver station (BTS), Central Unit (e.g., in a gNB), Distributed Unit (e.g., in a gNB), Baseband Unit, Centralized Baseband, C-RAN, access point (AP), transmission points, transmission nodes, RRU, RRH, nodes in distributed antenna system (DAS), core network node (e.g., MSC, MME, etc.), O&M, OSS, SON, positioning node (e.g., E-SMLC), etc.

A wireless network (also referred to as a cellular network) is a network of devices communicating using radio waves (electromagnetic waves within the frequencies 30 KHz-300 GHz). A wireless communication may follow wireless communication standards, such as new radio (NR), LTE (Long-Term Evolution), LTE-Advanced (LTE-A), wideband code division multiple access (WCDMA), High-Speed Packet Access (HSPA), WiFi (wireless fidelity), and Bluetooth. Furthermore, the communications between the devices such as network devices and mobile devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

A communications network includes one or more wireless and/or wireline networks, and it includes networks such as wide area networks (WANs), metropolitan area networks (MAN), local area networks (LANs), internet area networks (IANs), campus area networks (CANs), and virtual private networks (VPNs). The communications network may implement a variety of management interfaces and protocols as discussed herein.

Alternative Embodiments

While the invention has been described in terms of several embodiments, those skilled in the art will recognize that the invention is not limited to the embodiments described and can be practiced with modification and alteration within the spirit and scope of the appended claims. The description is, thus, to be regarded as illustrative instead of limiting.

EMBODIMENTS

The embodiments of the invention include the following:
1. A method performed by a network device, the method comprising: determining (302) a first cache of the network device is overloaded, wherein the first cache is
    within a cache hierarchy including a plurality of caches, each cache including a set of forwarding table entries for the network device to forward packets of traffic flows,
    wherein one cache lower in the cache hierarchy is to be checked earlier in flow lookup than one higher in the cache hierarchy; and
    upon determining (304) that the first cache is overloaded, disabling the first cache from the flow lookup, wherein the flow lookup skips the first cache and is performed at a second cache higher in the cache hierarchy, and
    disabling the first cache from forwarding table entry insertion when the forwarding table entry insertion is performed in one or more caches of the plurality of caches.
2. The method of embodiment 1, wherein the first cache is determined to be overloaded based on evaluating one or more of a first count of cache evictions, a second count of forwarding table entry insertions, and a third count of cache hits.
3. The method of embodiment 2, wherein the first cache is determined to be overloaded when a first measurement of the first, second, and third counts crosses a first threshold.
4. The method of embodiment 2, wherein the first cache is determined to be overloaded when a first measurement of the first, second, and third counts crosses a first threshold in a plurality of consecutive intervals.
5. The method of embodiment 1, further comprising:
    after a first time period, allowing (306) the first cache to perform the forwarding table entry insertion when the forwarding table entry insertion is performed in one or more other caches of the plurality of caches; and
    evicting (308) one or more forwarding table entries within the first cache when the first cache is deemed full and a forwarding table entry is to be inserted in the first cache.
6. The method of embodiment 5, further comprising:
    when a second measurement of a first count of cache evictions and a second count of forwarding table entry insertions is below a second threshold in a second time period, enabling (310) the first cache to perform the flow lookup.
7. The method of embodiment 5, further comprising:
    when a second measurement of a first count of cache evictions and a second count of forwarding table entry insertions is below a second threshold in a plurality of consecutive intervals, enabling (310) the first cache to perform the flow lookup.
8. The method of embodiment 5, further comprising:
    when a second measurement of a first count of cache evictions and a second count of forwarding table entry insertions crosses a second threshold in a configured time period, disabling (312) the first cache from the forwarding table entry insertion; and
    waiting (314) for a third time period before allowing the first cache to perform the forwarding table entry insertion when the forwarding table entry insertion is performed in one or more caches of the plurality of caches.

9. A network device (602, 604), comprising:
  a processor (612, 642) and non-transitory computer-readable storage medium (618, 648) that provides instructions that, when executed by the processor, cause the network device to perform methods 1 to 8.

10. A non-transitory computer-readable storage medium (618, 648) that provides instructions that, when executed, cause a network device to perform methods 1 to 8.

What is claimed is:

1. A method performed by a network device, the method comprising:
  determining a first cache of the network device is overloaded, wherein the first cache is within a cache hierarchy including a plurality of caches, each cache including a set of forwarding table entries for the network device to forward packets of traffic flows, and wherein one cache lower in the cache hierarchy is to be checked earlier in flow lookup than one higher in the cache hierarchy;
  upon determining that the first cache is overloaded,
    disabling the first cache from the flow lookup, wherein the flow lookup skips the first cache and is performed at a second cache higher in the cache hierarchy, and
    disabling the first cache from forwarding table entry insertion when the forwarding table entry insertion is performed in one or more caches of the plurality of caches;
  after a first time period, allowing the first cache to perform the forwarding table entry insertion when the forwarding table entry insertion is performed in one or more other caches of the plurality of caches;
  evicting one or more forwarding table entries within the first cache when the first cache is deemed full and a forwarding table entry is to be inserted in the first cache; and
  adjusting a time period ($T_{dry}$) to include a back-off time for enabling the forwarding table entry insertion again, the back-off time is added so that the first cache stays in a cache disabled state for a long period before returning to a cache tryout state.

2. The method of claim 1, wherein the first cache is determined to be overloaded based on evaluating one or more of a first count of cache evictions, a second count of forwarding table entry insertions, and a third count of cache hits.

3. The method of claim 2, wherein the first cache is determined to be overloaded when a first measurement of the first, second, and third counts crosses a first threshold.

4. The method of claim 2, wherein the first cache is determined to be overloaded when a first measurement of the first, second, and third counts crosses a first threshold in a plurality of consecutive intervals.

5. The method of claim 1, further comprising:
  when a second measurement of a first count of cache evictions and a second count of forwarding table entry insertions is below a second threshold in a second time period, enabling the first cache to perform the flow lookup.

6. The method of claim 1, further comprising:
  when a second measurement of a first count of cache evictions and a second count of forwarding table entry insertions is below a second threshold in a plurality of consecutive intervals, enabling the first cache to perform the flow lookup.

7. The method of claim 1, further comprising:
  when a second measurement of a first count of cache evictions and a second count of forwarding table entry insertions crosses a second threshold in a configured time period, disabling the first cache from the forwarding table entry insertion; and
  waiting for a third time period before allowing the first cache to perform the forwarding table entry insertion when the forwarding table entry insertion is performed in one or more caches of the plurality of caches.

8. A network device, comprising:
  a processor and non-transitory computer-readable storage medium that provides instructions that, when executed by the processor, cause the network device to perform:
    determining a first cache of the network device is overloaded, wherein the first cache is within a cache hierarchy including a plurality of caches, each cache including a set of forwarding table entries for the network device to forward packets of traffic flows, and wherein one cache lower in the cache hierarchy is to be checked earlier in flow lookup than one higher in the cache hierarchy;
    upon determining that the first cache is overloaded,
      disabling the first cache from the flow lookup, wherein the flow lookup skips the first cache and is performed at a second cache higher in the cache hierarchy, and
      disabling the first cache from forwarding table entry insertion when the forwarding table entry insertion is performed in one or more caches of the plurality of caches;
    after a first time period, allowing the first cache to perform the forwarding table entry insertion when the forwarding table entry insertion is performed in one or more other caches of the plurality of caches;
    evicting one or more forwarding table entries within the first cache when the first cache is deemed full and a forwarding table entry is to be inserted in the first cache; and
    adjusting a time period ($T_{dry}$) to include a back-off time for enabling the forwarding table entry insertion again, the back-off time is added so that the first cache stays in a cache disabled state for a long period before returning to a cache tryout state.

9. The network device of claim 8, wherein the first cache is determined to be overloaded based on evaluating one or more of a first count of cache evictions, a second count of forwarding table entry insertions, and a third count of cache hits.

10. The network device of claim 9, wherein the first cache is determined to be overloaded when a first measurement of the first, second, and third counts crosses a first threshold.

11. The network device of claim 9, wherein the first cache is determined to be overloaded when a first measurement of the first, second, and third counts crosses a first threshold in a plurality of consecutive intervals.

12. The network device of claim 8, wherein the instructions, when executed by the processor, are capable of further causing the network device to perform:
  when a second measurement of a first count of cache evictions and a second count of forwarding table entry insertions is below a second threshold in a second time period, enabling the first cache to perform the flow lookup.

13. The network device of claim 8, wherein the instructions, when executed by the processor, are capable of further causing the network device to perform:
  when a second measurement of a first count of cache evictions and a second count of forwarding table entry insertions is below a second threshold in a plurality of consecutive intervals, enabling the first cache to perform the flow lookup.

14. A non-transitory computer-readable storage medium that provides instructions that, when executed by a processor of a network device, are capable of causing the network device to perform:

determining a first cache of the network device is overloaded, wherein the first cache is within a cache hierarchy including a plurality of caches, each cache including a set of forwarding table entries for the network device to forward packets of traffic flows, and wherein one cache lower in the cache hierarchy is to be checked earlier in flow lookup than one higher in the cache hierarchy; and upon determining that the first cache is overloaded,
disabling the first cache from the flow lookup, wherein the flow lookup skips the first cache and is performed at a second cache higher in the cache hierarchy, and
disabling the first cache from forwarding table entry insertion when the forwarding table entry insertion is performed in one or more caches of the plurality of caches;

after a first time period, allowing the first cache to perform the forwarding table entry insertion when the forwarding table entry insertion is performed in one or more other caches of the plurality of caches;

evicting one or more forwarding table entries within the first cache when the first cache is deemed full and a forwarding table entry is to be inserted in the first cache; and adjusting a time period ($T_{dry}$) to include a back-off time for enabling the forwarding table entry insertion again, the back-off time is added so that the first cache stays in a cache disabled state for a long period before returning to a cache tryout state.

15. The non-transitory computer-readable storage medium of claim 14, wherein the instructions, when executed by the processor, are capable of further causing the network device to perform:

when a second measurement of a first count of cache evictions and a second count of forwarding table entry insertions is below a second threshold in a second time period, enabling the first cache to perform the flow lookup.

16. The non-transitory computer-readable storage medium of claim 14, wherein the instructions, when executed by the processor, are capable of further causing the network device to perform:

when a second measurement of a first count of cache evictions and a second count of forwarding table entry insertions is below a second threshold in a plurality of consecutive intervals, enabling the first cache to perform the flow lookup.

17. The non-transitory computer-readable storage medium of claim 14, wherein the instructions, when executed by the processor, are capable of further causing the network device to perform:

when a second measurement of a first count of cache evictions and a second count of forwarding table entry insertions crosses a second threshold in a configured time period, disabling the first cache from the forwarding table entry insertion; and waiting for a third time period before allowing the first cache to perform the forwarding table entry insertion when the forwarding table entry insertion is performed in one or more caches of the plurality of caches.

* * * * *